(No Model.) 2 Sheets—Sheet 1.

O. TABER & H. F. LOW.
SADDLE.

No. 424,622. Patented Apr. 1, 1890.

WITNESSES
Howard F. Eaton.
Frederick L. Emery.

INVENTORS
Orrin Taber,
Hamilton F. Low,
by Crosby & Gregory
Attys.

(No Model.) 2 Sheets—Sheet 2.

O. TABER & H. F. LOW.
SADDLE.

No. 424,622. Patented Apr. 1, 1890.

WITNESSES
Howard F. Eaton.
Frederick L. Emery.

INVENTORS
Orrin Taber,
Hamilton F. Low,
by Crosby & Gregory
Attys

UNITED STATES PATENT OFFICE.

ORRIN TABER AND HAMILTON F. LOW, OF WILTON, ASSIGNORS TO THE NASHUA SADDLERY HARDWARE COMPANY, OF NASHUA, NEW HAMPSHIRE.

SADDLE.

SPECIFICATION forming part of Letters Patent No. 424,622, dated April 1, 1890.

Application filed August 23, 1889. Serial No. 321,725. (No model.)

*To all whom it may concern:*

Be it known that we, ORRIN TABER and HAMILTON F. LOW, of Wilton, county of Hillsborough, State of New Hampshire, have invented an Improvement in Saddles, of which the following description, in connection with the accompanying drawings, is a specification, like letters on the drawings representing like parts.

This invention has for its object to construct a saddle whereby the seat and checkrein-hook may be held firmly in position on the tree without rattling and against displacement.

In carrying out this invention the checkrein-hook has formed on it or attached to it at its under side two or more lugs, one of which is screw-threaded. The seat has one or more openings through it for the lugs, and has also a boss upon its under side and a recess upon its upper side above the boss, and the saddle-tree has two or more holes in it, one for each lug of the checkrein-hook, and has also a recess to receive the boss, which is on the under side of the seat. Holes are formed through the boss and tree which register with each other, and which receive the bolt, the head of which occupies a position in the recess formed in the seat above the boss. Conical nuts are screwed onto one or both bolts, said nuts entering countersinks or tapering sockets formed to thereby present large friction-surfaces, which assist in holding the nuts in place.

Figure 1:
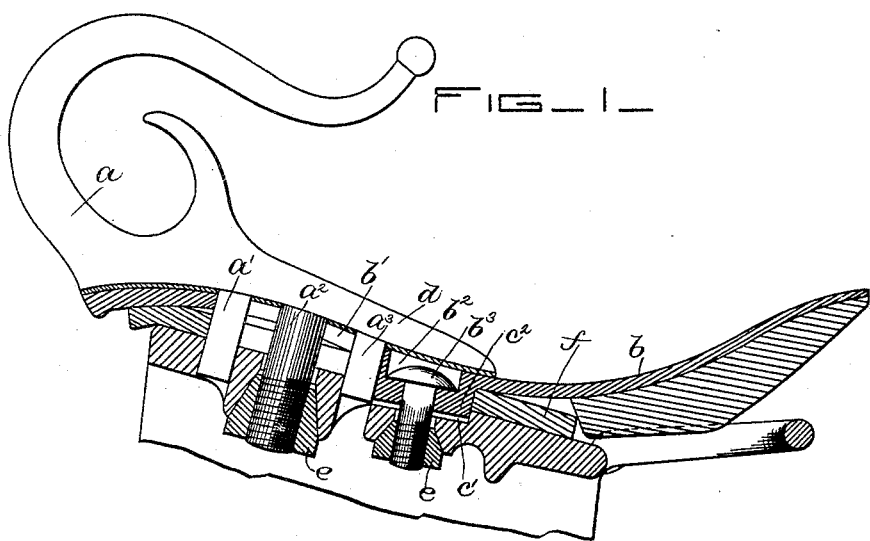
Figure 2:
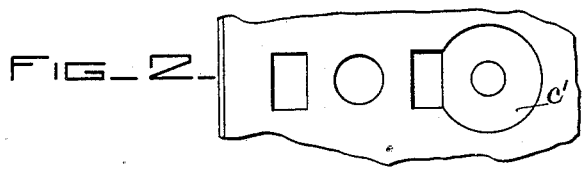
Figure 3:
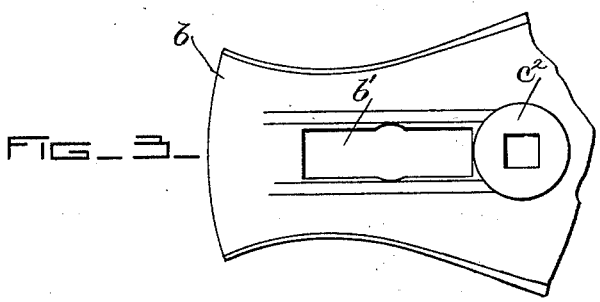

Figure 1 shows in section and partial elevation a saddle embodying this invention; Fig. 2, a plan view of a portion of the saddle-tree; Fig. 3, a plan view of a portion of the seat, and Fig. 4 a modification to be referred to.

The checkrein-hook $a$ (see Fig. 1) has formed on its under side three lugs $a'$ $a^2$ $a^3$, one of which, as $a^2$, is made somewhat longer and is screw-threaded. The seat $b$ has an opening $b'$ through it for the lugs $a'$ $a^2$ $a^3$, and the seat $b$ has also a recess $b^2$, which receives the head of a bolt $b^3$, which passes through the seat and tree. The tree $c$ has holes to receive the lugs $a'$ $a^2$ $a^3$, and also has formed in its upper side a recess $c'$, which receives a boss $c^2$, formed on the under side of the seat $b$. Conical nuts $e$ are turned on the bolt $b^3$ and screw-threaded lug $b^2$, said nuts fitting countersinks or tapering sockets formed in the under side of the seat $c$, said conical nuts being prevented from turning easily by the friction produced by contact with the tree. The friction-nuts $e$ do not readily become loosened, and hence are very desirable.

By means of the lugs shown all the parts are held firmly in place.

The checkrein-hook is represented as having a rearwardly-extended part $d$, to which the lugs are attached, said part covering the bolt $b^3$, so that it cannot be removed or displaced.

Figure 4:
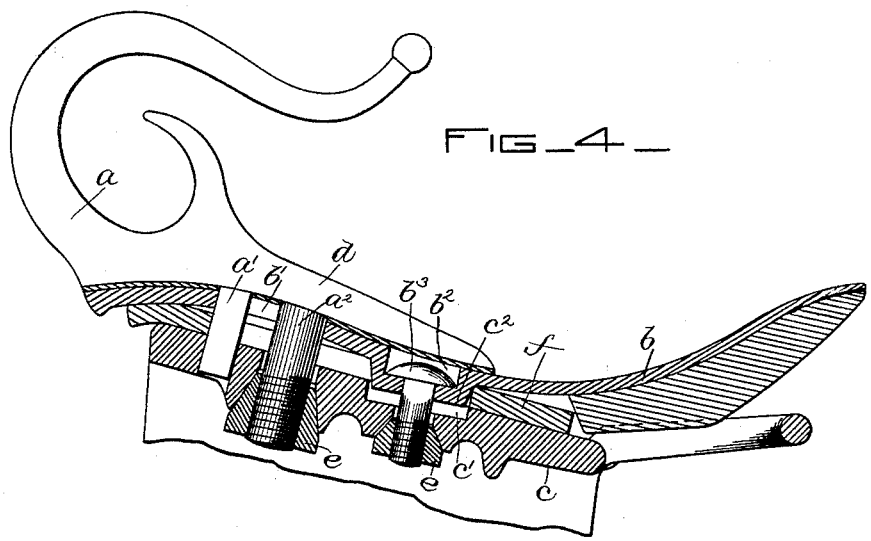

In Fig. 4 we have shown one of the lugs, as $a^3$, removed, so that the saddle may be made narrower.

A packing $f$ is preferably interposed between the seat and tree.

In lieu of the longitudinal hole $b'$, formed in the seat to receive the lugs $a'$ $a^2$ $a^3$, (see Fig. 1,) or it may be the lugs $a'$ $a^2$, (see Fig. 4,) separate holes may be formed for each lug.

We claim—

1. A saddle-tree having one or more holes through it and a tapering concavity in its under side, combined with a seat having one or more holes through it registering with the hole or holes in the tree, and a check-rein hook having two lugs $a'$ $a^2$, which enter or pass through the said hole or holes, one of which, as $a^2$, is externally screw-threaded at its end to receive a conical nut, substantially as described.

2. A saddle-tree having a series of holes through it, a seat resting on the tree and having a longitudinal opening or equivalent therein registering with the series of holes in the tree, a checkrein-hook having a lug $a^2$, externally screw-threaded, which passes down through the opening in the seat and through one of the holes in the tree, and a nut for said screw-threaded lug, combined with a short steady-pin $a'$, formed integral with the hook and passing down through the opening in the seat and into the tree, substantially as and for the purposes set forth.

3. The saddle-tree having a recess $c'$, combined with the seat having the boss $c^2$ and depression $b^2$, and the bolt and nut, substantially as described.

4. The seat having a recess $b^2$, and a tree and fastening for the seat and tree, the head of which occupies a position in the recess, combined with a checkrein-hook having a part $d$ extended to cover the recess $b^2$, substantially as described.

In testimony whereof we have signed our names to this specification in the presence of two subscribing witnesses.

ORRIN TABER.
HAMILTON F. LOW.

Witnesses:
BERNICE J. NOYES,
EMMA S. BENNETT.